United States Patent
Lee et al.

(10) Patent No.: US 9,775,066 B2
(45) Date of Patent: Sep. 26, 2017

(54) METHOD FOR MANAGING RADIO RESOURCE IN MULTI-CELL WIRELESS COMMUNICATION SYSTEM AND DEVICE THEREFOR

(71) Applicant: LG ELECTRONICS INC., Seoul (KR)

(72) Inventors: Seungmin Lee, Seoul (KR); Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 14/758,940

(22) PCT Filed: Jan. 10, 2014

(86) PCT No.: PCT/KR2014/000319
§ 371 (c)(1),
(2) Date: Jul. 1, 2015

(87) PCT Pub. No.: WO2014/109598
PCT Pub. Date: Jul. 17, 2014

(65) Prior Publication Data
US 2015/0341816 A1    Nov. 26, 2015

Related U.S. Application Data

(60) Provisional application No. 61/751,250, filed on Jan. 10, 2013.

(51) Int. Cl.
*H04L 12/26* (2006.01)
*H04W 24/10* (2009.01)
(Continued)

(52) U.S. Cl.
CPC .......... *H04W 24/10* (2013.01); *H04L 5/0092* (2013.01); *H04L 5/1469* (2013.01);
(Continued)

(58) Field of Classification Search
CPC ..................................................... H04W 24/10
See application file for complete search history.

(56) References Cited

U.S. PATENT DOCUMENTS

| | | | |
|---|---|---|---|
| 2012/0099505 | A1 | 4/2012 | Wang et al. |
| 2012/0115529 | A1 | 5/2012 | Sun |

(Continued)

FOREIGN PATENT DOCUMENTS

| | | |
|---|---|---|
| KR | 10-2012-0103200 | 9/2012 |
| WO | 2012/150894 | 11/2012 |

OTHER PUBLICATIONS

PCT International Application No. PCT/KR2014/000319, Written Opinion of the International Searching Authority dated May 13, 2014, 15 pages.

*Primary Examiner* — Shaq Taha
(74) *Attorney, Agent, or Firm* — Lee, Hong, Degerman, Kang & Waimey

(57) ABSTRACT

The present invention relates to a radio resource management (RRM) measurement method of a terminal and a device therefor in a multi-cell wireless communication system. Particularly, the RRM measurement method comprises the steps of: receiving, from a serving cell, information associated with an RRM for a neighboring cell; and performing an RRM measurement for the neighboring cell according to the information associated with the RRM, wherein the serving cell and the neighboring cell are respectively set to change at least one uplink subframe according to a preset uplink-downlink configuration (UL-DL configuration) for downlink communication, and subframes for an RRM measurement for the neighboring cell are considered (Continued)

to be the same as subframes for an RRM measurement of the serving cell if the information associated with the RRM indicates the uplink-downlink configurations (UL-DL configurations) of the serving cell and the neighboring cell are the same.

8 Claims, 10 Drawing Sheets

(51) Int. Cl.
    *H04W 72/04*     (2009.01)
    *H04W 72/08*     (2009.01)
    *H04W 72/00*     (2009.01)
    *H04L 5/00*     (2006.01)
    *H04L 5/14*     (2006.01)

(52) U.S. Cl.
    CPC ....... *H04W 72/005* (2013.01); *H04W 72/042* (2013.01); *H04W 72/0446* (2013.01); *H04W 72/085* (2013.01)

(56) References Cited

U.S. PATENT DOCUMENTS

| | | |
|---|---|---|
| 2013/0003578 A1 | 1/2013 | Hu et al. |
| 2013/0039203 A1* | 2/2013 | Fong ................ H04B 7/024 370/252 |
| 2015/0029885 A1* | 1/2015 | Seo ................ H04W 24/10 370/252 |

* cited by examiner

FIG. 2
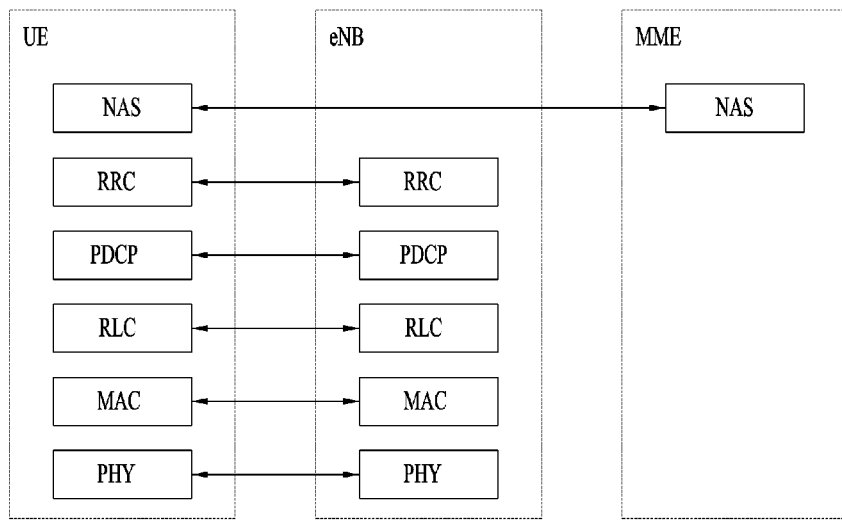
(a) Control-Plane Protocol Stack
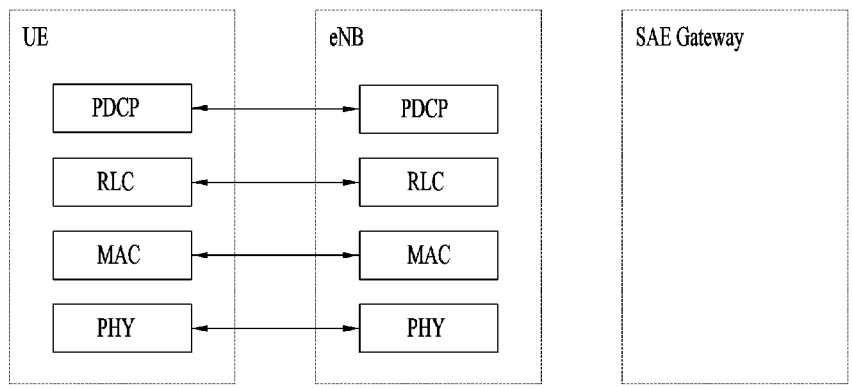
(b) User-Plane Protocol Stack

METHOD FOR MANAGING RADIO RESOURCE IN MULTI-CELL WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2014/000319, filed on Jan. 10, 2014, which claims the benefit of U.S. Provisional Application No. 61/751,250, filed on Jan. 10, 2013, the contents of which are all hereby incorporated by reference herein in their entirety.

FIELD OF THE INVENTION

The present invention relates to a wireless communication system and, most particularly, to a method for managing radio resource in a multi-cell wireless communication system and a device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 illustrates an E-UMTS network structure as an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DETAILED DESCRIPTION OF THE INVENTION

Technical Objects

An object of the present invention is to provide a method for managing radio resource in a multi-cell wireless communication system and a device therefor The technical objects of the present invention will not be limited only to the objects described above, and, accordingly, other technical objects that have not been mentioned above may become apparent to those having ordinary skill in the art from the description presented below.

Technical Solutions

According to an aspect of the present invention for resolving the above-described problem, a Radio Resource Management (RRM) measurement method of a user equipment in a multi-cell wireless communication system includes a step of receiving, from a Serving Cell, information associated with an RRM for a Neighboring Cell; and a step of performing an RRM measurement for the neighboring cell according to the information associated with the RRM, and, herein, the serving cell and the neighboring cell may be respectively set to change at least one uplink subframe according to a preset uplink-downlink configuration (UL-DL configuration) for downlink communication, and subframes for an RRM measurement for the neighboring cell may be considered to be the same as subframes for an RRM measurement of the serving cell, if the information associated with the RRM indicates the uplink-downlink configurations (UL-DL configurations) of the serving cell and the neighboring cell are the same.

Additionally, the preset uplink-downlink configuration may be configured in accordance with a SIB (System Information Block) or configured in accordance with a higher layer signaling.

Additionally, the subframes for an RRM measurement may correspond to subframes configured only for a downlink.

Additionally, the information associated with the RRM may correspond to NeighCellConfig, and, preferably, the NeighCellConfig information may be configured as a bitmap, and, in case the bitmap corresponds to one of '00', '01', and '10', the NeighCellConfig may indicate that the uplink-downlink configurations (UL-DL configurations) of the serving cell and the neighboring cell are the same.

Additionally, in case a subframe group set to MBSFN (Multicast Broadcast Single Frequency Network) with respect to the serving cell is different from a subframe group set to MBSFN (Multicast Broadcast Single Frequency Network) with respect to the neighboring cell, the subframes for an RRM measurement may correspond to subframes configured only for a downlink.

According to another aspect of the present invention for resolving the above-described problem, a user equipment performing a Radio Resource Management (RRM) measurement in a multi-cell wireless communication system includes a Radio Frequency Unit; and a Processor, wherein the Processor may be configured to receive, from a Serving Cell, information associated with an RRM for a Neighboring Cell, and to perform an RRM measurement for the neighboring cell according to the information associated with the RRM, and, herein, the serving cell and the neighboring cell may be respectively set to change at least one uplink subframe according to a preset uplink-downlink configuration (UL-DL configuration) for downlink communication, and subframes for an RRM measurement for the neighboring cell may be considered to be the same as subframes for an RRM measurement of the serving cell, if the information associated with the RRM indicates the uplink-downlink configurations (UL-DL configurations) of the serving cell and the neighboring cell are the same.

Advantageous Effects

According to the present invention, in a case when radio resources are dynamically changed in accordance with a system load in a wireless communication system, the user equipment may be capable of efficiently performing radio resource management.

The effects of the present invention will not be limited only to the effects described above, and, accordingly, other effects that have not been mentioned above may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

FIG. 2 illustrates a Control Plane structure and a User Plane structure of a Radio Interface Protocol between a user equipment and the E-UTRAN based upon the 3GPP radio access network standard.

BEST MODE FOR CARRYING OUT THE PRESENT INVENTION

Figure 1:
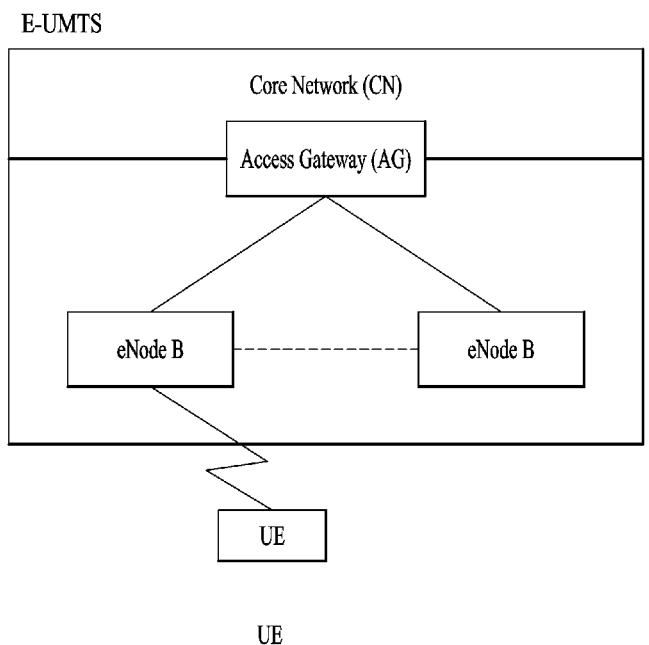
FIG. 1 illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 illustrates a Control Plane structure and a User Plane structure of a Radio Interface Protocol between a user equipment and the E-UTRAN based upon the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
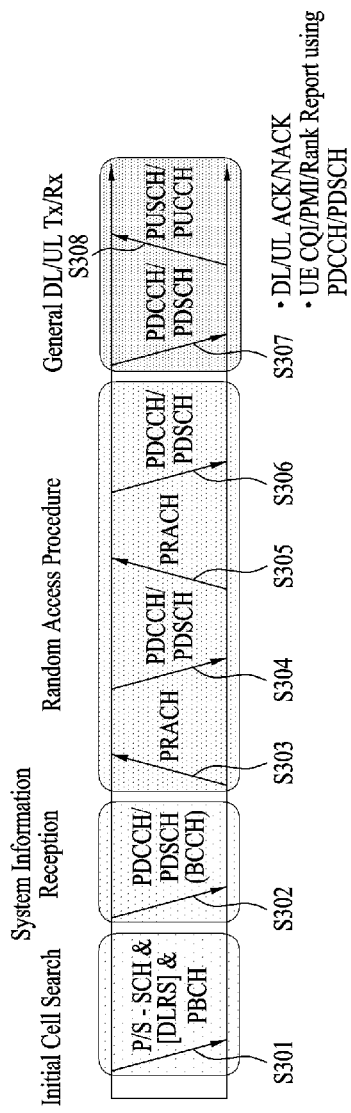
FIG. 3 illustrates physical channels that are used in the 3GPP system and a general method for transmitting signals using such physical channels.

FIG. 3 illustrates physical channels that are used in the 3GPP system and a general method for transmitting signals using such physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
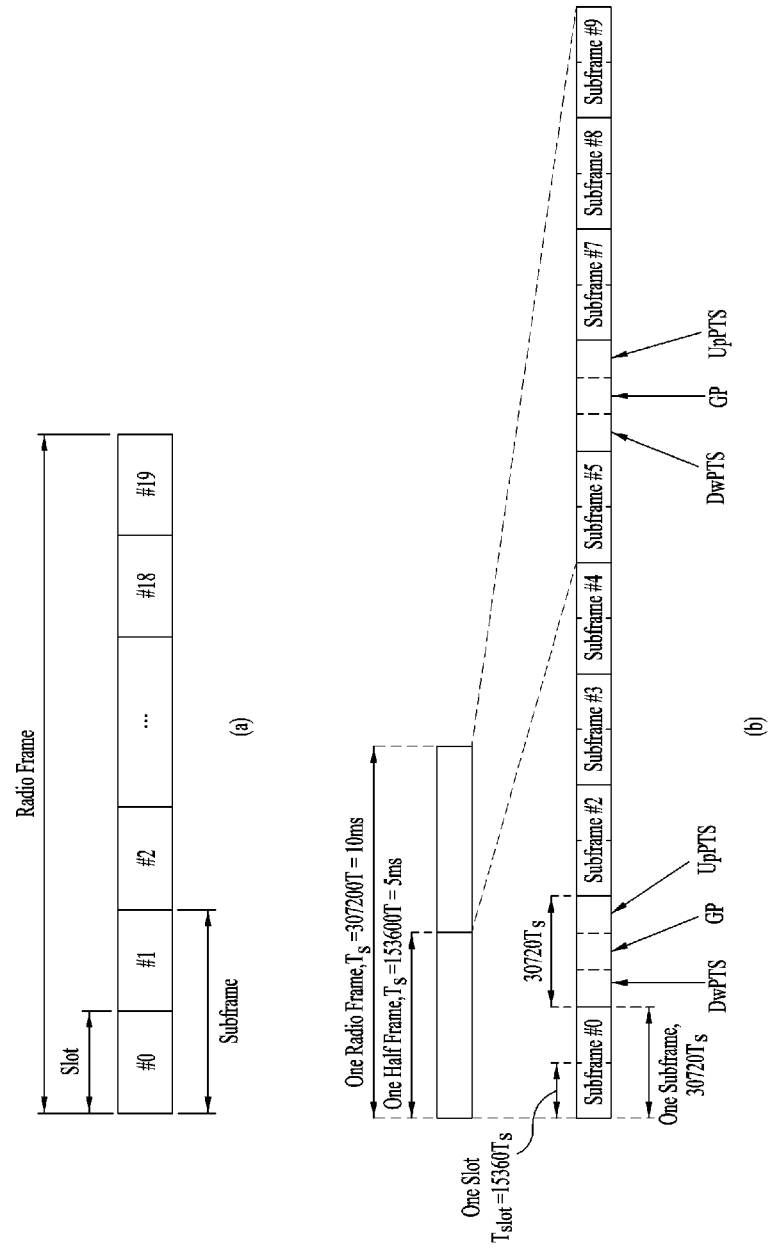
FIG. 4 illustrates an exemplary structure of a radio frame that is used in the LTE system.

FIG. 4 illustrates an exemplary structure of a radio frame that is used in the LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
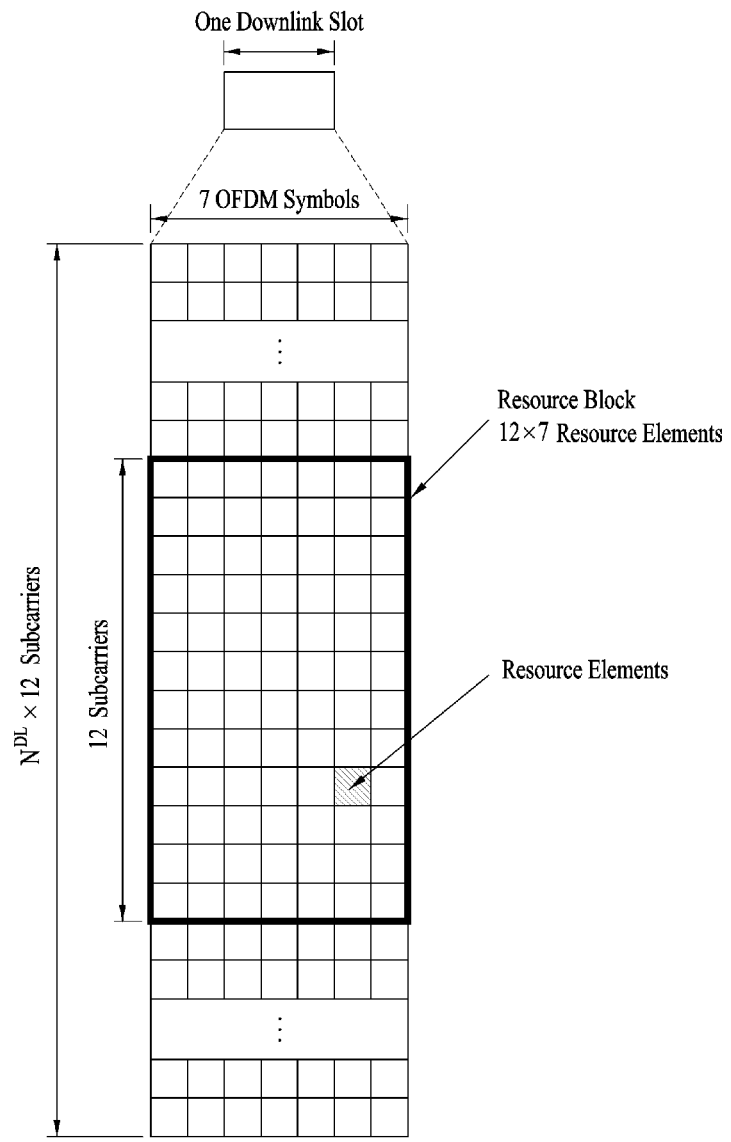
FIG. 5 illustrates a resource grid respective to a downlink slot.

FIG. 5 illustrates a resource grid respective to a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 6:
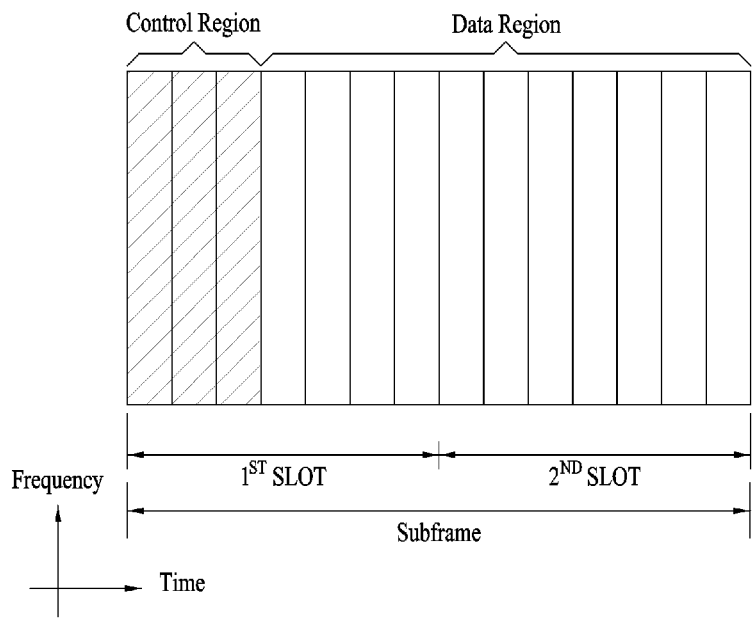
FIG. 6 illustrates an exemplary structure of a downlink subframe.

FIG. 6 illustrates an exemplary structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
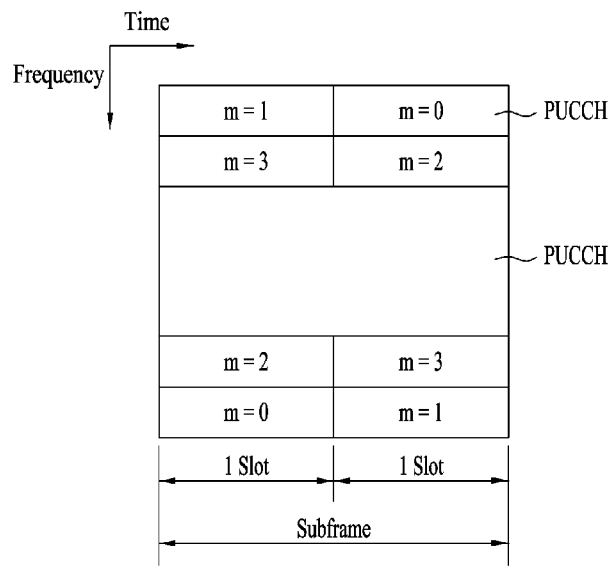
FIG. 7 illustrates an exemplary structure of an uplink subframe that is used in the LTE system.

FIG. 7 illustrates an exemplary structure of an uplink subframe that is used in the LTE system.

Referring to FIG. 7, an uplink subframe includes multiple (e.g., 2) slots. A slot may include different numbers of SC-FDMA symbols based upon a CP length. In the frequency domain, an uplink subframe may be divided into a control region and a data region. The data region includes a PUSCH and is used for transmitting data signals, such as sound. The control region includes a PUCCH and is used for transmitting Uplink Control Information (UCI). The PUCCH includes an RB pair, which is located at each end portion of the data region along the frequency axis, and may be frequency-hopped at the slot boundary.

The PUCCH may be used for transmitting the following control information.

- SR (Scheduling Request): corresponds to information that is used for requesting uplink UL-SCH resource. The SR is transmitted by using an OOK (On-Off Keying) method.
- HARQ-ACK/NACK: corresponds to a response signal for a downlink data packet within the PDSCH. The HARQ-ACK/NACK indicates whether or not the downlink data packet has been successfully received. A 1-bit ACK/NACK is transmitted as a response for a single downlink codeword, and a 2-bit ACK/NACK is transmitted as a response for two downlink codewords.
- CSI (Channel State Information): The CSI corresponds to feedback information respective to a downlink channel. The CSI includes the CQI (Channel Quality Indicator), and feedback information related to the MIMO (Multiple Input Multiple Output) includes an RI (Rank Indicator), PMI (Precoding Matrix Indicator), PTI (Precoding Type Indicator), and so on. 20 bits are used for each subframe.

The amount (or size) of the control information (UCI) that can be transmitted by the user equipment from a subframe depends upon a number of SC-FDMAs that are available for control information transmission. The SC-FDMAs that are available for control information transmission refers to SC-FDMA symbols that remain after excluding the SC-FDMA symbol for reference signal transmission from the subframe. And, in case of a subframe having an SRS (Sounding Reference Signal) determined therein, the last SC-FDMA symbol of the subframe may also be excluded. Herein, a reference signal is used for a coherent detection of the PUCCH.

Hereinafter, CoMP (Cooperative Multipoint Transmission/Reception) will be described in detail.

The systems following LTE-A seek to adopt a method for enhancing system performance by allowing cooperation between multiple cells to be established. And, such method is referred to as Cooperative Multipoint Transmission/Reception (CoMP). CoMP refers to a method for establishing communication between a user equipment and two or more base stations, access points, or cells by having the two or more base stations, access points, or cells cooperate with one another in order to facilitate communication between a specific user equipment and a base station, access point, or cell. In the present invention, base station, access point, or cell may be used in the same significance.

Generally, in a multi-cell environment having a frequency reuse factor of 1, the performance and average sector throughput of the UE, which is located on the cell-edge, may be reduced due to Inter-Cell Interference (ICI). In order to reduce the ICI, the conventional LTE system uses a method of enabling the UE, which is located on the cell-edge, to have appropriate throughput performance in an environment that is limited due to the interference by using a simple passive method, such as fractional frequency reuse (FFR), through the UE-specific power control. However, instead of decreasing the use of frequency resources per cell, it may be preferable to reduce the ICI or to have the UE reuses the ICI as a wanted signal. In order to accomplish the above-described object, a CoMP transmission scheme (or method) may be applied.

Figure 8:
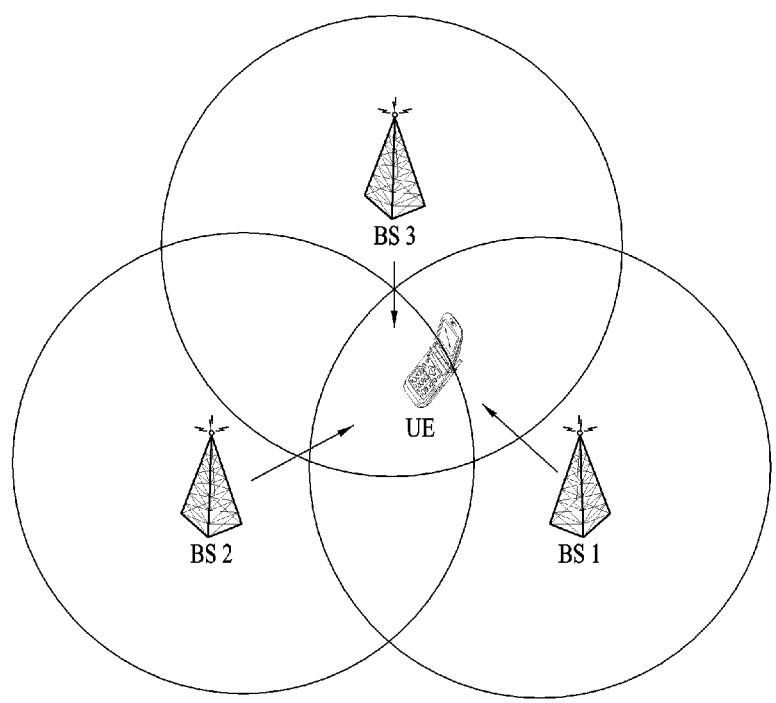
FIG. 8 illustrates an example of performing CoMP.

FIG. 8 illustrates an example of performing CoMP. Referring to FIG. 8, a wireless communication system includes multiple base stations (BS1, BS2, and BS3) being configured to perform CoMP and a user equipment. The multiple base stations (BS1, BS2, and BS3) being configured to perform CoMP cooperate with one another, thereby being capable of efficiently transmitting data to the user equipment. The CoMP may be broadly divided into two different types based upon whether or not data transmission is performed by each of the base stations being configured to perform CoMP:

Joint Processing (CoMP Joint Processing: CoMP-JP)
Cooperative Scheduling/Beamforming (CoMP-CS/CB, CoMP Cooperative scheduling: CoMP-CS)

In case of the CoMP-JP, data designated to a single user equipment are simultaneously transmitted to the user equipment from each of the base stations being configured to perform CoMP, and the user equipment combines the signals received from each base station, thereby enhancing its receiving performance. More specifically, in the CoMP-JP method, each point (base station) of a CoMP coordination (or cooperation) unit may use data. The CoMP coordination unit refers to a set (or group) of base stations used in the CoMP method. The JP method may be divided into a Joint Transmission method and a Dynamic cell selection method.

The joint transmission method refers to a method for simultaneously transmitting a PDSCH from multiple points (a part of the CoMP coordination unit or the whole CoMP coordination unit). More specifically, the data being transmitted to a single user equipment (UE) may be simultaneously transmitted from multiple transmission points. According to the joint transmission method, the quality of a received signal may be coherently or non-coherently enhanced, and, interference with another user equipment may be actively cancelled (or eliminated).

The dynamic cell selection method refers to a method for transmitting a PDSCH from one point (of the CoMP coordination unit) at a time. More specifically, the data being transmitted to a single UE at a specific time points is transmitted from a single point, and data transmission is not performed to the corresponding user equipment (UE) at the same time point from other points within the coordination unit, and the point from which the data are being transmitted to the corresponding user equipment may be dynamically selected.

Conversely, in case of CoMP-CS, data designated to a single user equipment are transmitted through a single base station at an arbitrary moment, and scheduling or Beamforming is realized so that interference caused by another base station can be minimized. More specifically, according to the CS/CB method, the CoMP coordination units may cooperatively perform beamforming of the data transmission to a single UE. Herein, although the data are transmitted only from a serving cell, user scheduling/beamforming may be decided by the coordination of the cells of the corresponding CoMP unit.

Meanwhile, in an uplink, coordinated multi-point reception refers to the reception of a signal transmitted by a coordination of multiple points, which are geographically spaced apart from one another. The CoMP method that can be applied to the uplink may be divided into Joint Reception (JR) and coordinated scheduling/beamforming (CS/CB).

The JR scheme (or method) indicates that a signal, which is transmitted through the PUSCH, is received by multiple reception points, and the CS/CB scheme (or method) indicates that the PUSCH is received only from one point and that user scheduling/beamforming is decided by the coordination of the cells of the CoMP unit.

Hereinafter, interference between multiple cells will be described in detail.

As in a case when two base stations (e.g., base station #1 and base station #2) are positioned to be adjacent to one another, in case the coverage of both base stations partially overlap one another, when the user equipment is being serviced by one of the base stations, an intense downlink signal transmitted from the other base station with respect to the user equipment may cause interference. As described above, in case an inter-cell interference occurs, the inter-cell interference may be reduced by using an inter-cell cooperative signaling method between the two base stations. In the diverse exemplary embodiments of the present invention, which will hereinafter be described in detail, a case when signal transmission/reception between two base stations transmitting and receiving interference to and from one another is performed smoothly will be assumed. For example, a case when reliability in the transmission/reception of the cooperative signal between the base stations is high will be assumed herein, due to the presence of a wired/wireless link (e.g., Backhaul link or Un interface) having a good transmission condition, such as transmission bandwidth or time delay, and so on, between the two base stations. Additionally, a case when the time synchronization between the two base stations match (or coincide) with one another within an allowable (or acceptable) error range (e.g., a case when the boundaries of a downlink subframe respective to the two base stations interfering with one another are aligned), and a case when an offset of the subframe boundaries between the two base stations is clearly recognized by both base stations may be assumed.

Referring back to FIG. 8, base station #1 may correspond to a macro base station, which provides service to a broad area at a high transmission power, and base station #2 may correspond to a micro base station (e.g., pico base station), which provides service to a narrow area at a low transmission power. As shown in the example of FIG. 8, in case a user equipment (UE), which is located at a cell boundary region of base station #2, and which is serviced by base station #2, received an intense interference from base station #1, it may be difficult to establish an effective communication without an adequate inter-cell cooperation.

Most particularly, in case of seeking to disperse (or distribute) the load of base station #1, which corresponds to the macro base station, for providing services, by having a large number of user equipment connected to base station #2, which corresponds to a micro base station having low power, the likelihood of the above-described inter-cell interference situation occurring is high. For example, when the user equipment seeks to select a serving base station, by using a method of adding a predetermined bias value to a receiving power received from the micro base station and not adding a predetermined bias value to a receiving power received from the macro base station, the receiving power of a downlink signal received from each base station may be calculated and compared, and, based upon the calculated and compared result, the user equipment may select the base station providing the highest downlink receiving power as the serving base station. Accordingly, a larger number of user equipments may be connected to the micro base station. Although the signal received from the macro base station, which is received by the user equipment, actually has a more intense downlink signal strength, the micro base station may still be selected as the serving base station, and the user equipment that is connected to the micro base station may experience a more intense interference from the macro base station. In this case, in case separate inter-cell cooperation is not provided to the user equipments that are located at the boundary of the micro base station, it may be difficult to properly perform operations due to the intense interference from the macro base station.

In order to perform effective operations even when an inter-cell interference exists, an adequate cooperation should be established between the two base stations, which transmit and receive inter-cell interference to and from one another, and a signal that allows such cooperative operation to be performed may be transmitted and/or received (or transceived) through a link between the two base stations. In this case, in case an inter-cell interference occurs between a macro base station and a micro base station, the macro base station may control the inter-cell cooperative operation, and the micro base station may also perform adequate operations in accordance with a cooperation signal that is notified by the macro base station.

Figure 9:
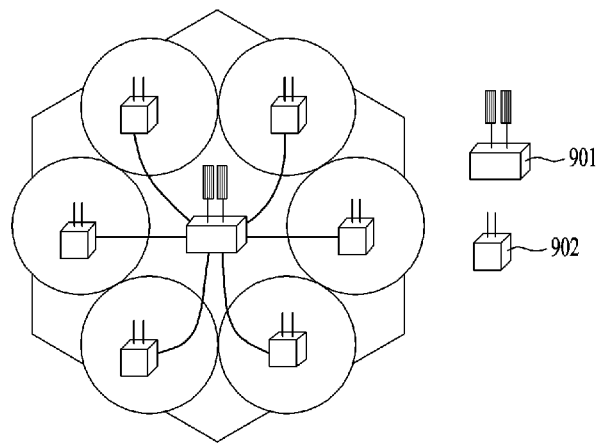
FIG. 9 illustrates a structure of a heterogeneous network to which the CoMP method can be applied.

FIG. 9 illustrates a structure of a heterogeneous network to which the CoMP method can be applied. Most particularly, FIG. 9 illustrates a network, which consists of a macro base station (901) and a RRH (radio remote head) (902), and so on, which transmits and receives (or transceives) signals at a relatively low transmission power. Herein, a pico eNB or RRH, which is located within the coverage of the macro base station, may be connected to the macro base station via optical cable. Additionally, the RRH may also be referred to as a micro base station.

Referring to FIG. 9, since the transmission power of a micro base station, such as a RRH, is relatively lower than the transmission power of a macro base station, it may be known that the coverage of each RRH is also relatively smaller than the coverage of the macro base station.

The above-described CoMP scenario expects to achieve covering a coverage hole of a specific region through the added RRHs as compared to a system, wherein only the legacy macro base station exists, or to gain an enhancement in an overall system throughput through a cooperative transmission between multiple transmission points (TPs) including the RRH and the macro base station.

Meanwhile, in FIG. 9, the RRHs may be categorized into two different types, wherein one type corresponds to a case when each of the RRHs is assigned with a cell identifier (cell-ID) that is different from that of the macro base station, thereby allowing each RRH to be determined as another small-sized cell, and the other type corresponds to a case when each RRH is given the same cell identifier as the macro base station and operated accordingly.

In case each of the RRHs and the macro base station are assigned with different cell identifiers, each of the RRHs and the macro base station are recognized by the UE as independent cells. At this point, the UE that is located at the boundary of each cell receives severe interference from its neighboring cell, and, herein, diverse CoMP methods are being proposed in order to reduce such interference effects and to enhance the transmission rate.

Subsequently, in case each of the RRHs and the macro base station are assigned with the same cell identifier, as described above, each of the RRHs and the macro base station are recognized by the UE as a single cell. The UE may receive data from each of the RRHs and the macro base station, and, in case of a data channel, by also applying precoding, which is used for data transmission of each UE, to the reference signal at the same time, each UE may estimate its actual channel to which data are being transmitted. Herein, the reference signal to which the precoding is being applied corresponds to the above-described DM-RS.

As described above, the user equipment of a legacy LTE system performs channel estimation only through CRS, and, through this, the user equipment may perform both data demodulation and channel state information feedback, and, in addition to this, the user equipment may also perform cell tracking, frequency offset compensation, synchronization, RRM (Radio Resource Management) measurement, such as RSSI (Received Signal Strength Indicator)/RSRP (Reference Signal Received Power)/RSRQ (Reference Signal Received Quality) measurement, and so on.

Meanwhile, in case of a user equipment of a LTE-A system, although the functions have been extended so that, among the functions of the legacy CRS, the functions related to the channel estimation and data demodulation are performed by the DM-RS, and the functions related to channel state information feedback are performed by the CSI-RS, the other functions may still be performed through the CRS.

Figure 10:
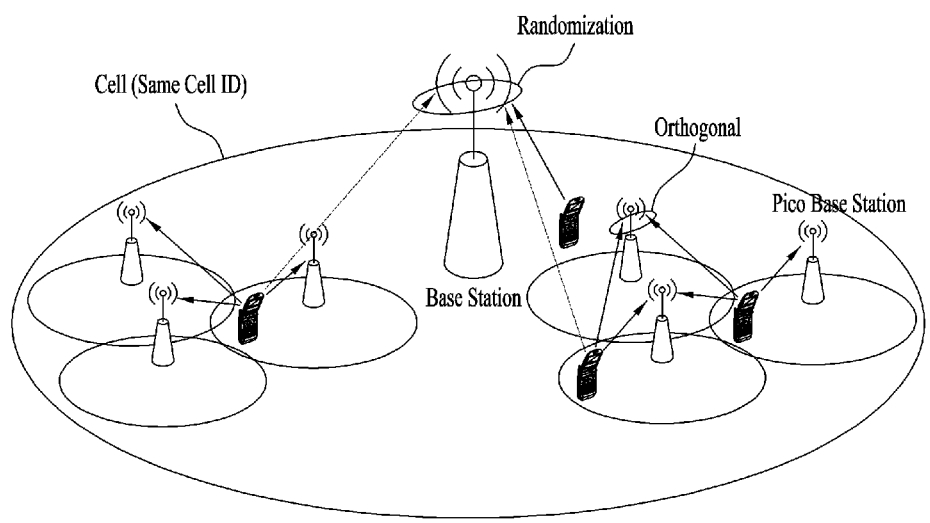
FIG. 10 illustrates a referential view for describing CoMP Scenario 4.

FIG. 10 illustrates a referential view for describing CoMP Scenario 4.

Referring to FIG. 10, the macro base station provides macro cell coverage. Multiple pico eNBs exist within the macro cell coverage. The macro base station and the multiple pico eNBs have the same cell ID. The UE may be categorized as a CoMP UE performing CoMP transmission and a non-CoMP UE not performing CoMP transmission. The CoMP UE may receive signals from multiple eNBs via downlink CoMP transmission, and the CoMP UE may transmit signals to multiple eNBs via uplink CoMP transmission. FIG. 10 illustrates an example of an uplink CoMP transmission, wherein the UE transmits signals to multiple eNBs. The eNB receives signals transmitted from multiple UEs. The signal that is received by the macro base station from the multiple UEs may be randomized Additionally, each UL RS that is respectively transmitted by each of the multiple UEs through the same bandwidth located at the same position within the frequency domain may maintain its orthogonality by different cyclic shifts.

Figure 11:
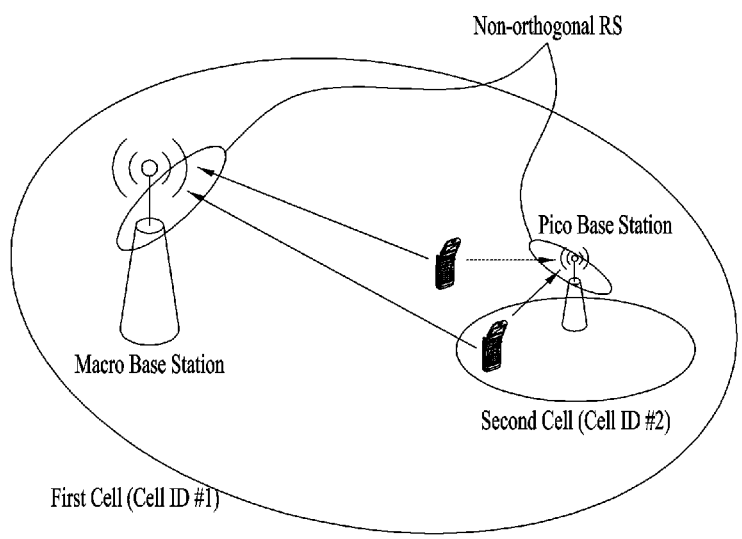
FIG. 11 illustrates a referential view for describing CoMP Scenario 3.

FIG. 11 illustrates a referential view for describing CoMP Scenario 3.

Referring to FIG. 11, CoMP Scenario 3 may also be referred to as a heterogeneous network each having a different cell ID. The macro base station provides macro cell coverage. In FIG. 9, the macro base station is assigned with cell ID #1. At least one pico eNB exists within the macro cell coverage. In FIG. 11, the pico eNB is assigned with cell ID #2. More specifically, the macro base station and the pico eNB are assigned with different cell IDs. In CoMP Scenario 3, CoMP UE may perform CoMP transmission with the macro base station and the pico eNB. FIG. 10 illustrates an example of an uplink CoMP transmission, wherein the CoMP UE transmits signals to the macro base station and the pico eNB.

In CoMP Scenario 3, shown in FIG. 11, even if multiple UEs overlap with one another, and even if each UE transmits a UL RS through different bandwidths, since UL RS sequences are generated based upon the different cell IDs, a high correlation between the UL RS sequences does not occur. More specifically, the UL RSs respectively transmitted from the multiple UEs are non-orthogonal. However, in case the CoMP UE performs uplink CoMP transmission, the performance gain may be enhanced due to the orthogonality of the UL RS between the cells.

Based upon the description provided above, the present invention proposes a method enabling Radio Resource Management (RRM) operations respective to a neighboring cell of a UE to be performed efficiently in a situation where the radio resource purpose (e.g., uplink resource or downlink resource) changes dynamically in accordance with a change in the load status.

The exemplary embodiments of the present invention will hereinafter be described based upon a 3GPP LTE system for simplicity in the description. However, the range of the system to which the present invention will be applied may also be extended to other systems apart from the 3GPP LTE system. Additionally, the exemplary embodiments of the present invention may also be extendedly applied to a case when D2D communication is performed based upon part of the time-frequency resource area of the legacy system and/or a case when D2D communication is performed by having a new time-frequency resource (other than that of the conventional (or legacy) resource) assigned (or allocated) for the D2D communication.

Generally, communication link status monitoring and/or whether or not Hand Over operations have been performed may be determined through the performance and reporting of radio resource management (RRM) (e.g., RSRP (Reference Signal Received Power) or RSRQ (Reference Signal Received Quality)), which is performed by the user equipment with respect to the serving cell and the neighboring cells.

RSRP (Reference Signal Received Power) may be defined as a linear average of the power being allocated to a resource element (RE), which transmits cell-specific reference signals within a measurement frequency bandwidth A cell-specific reference signal $R_0$ according to 3GPP TS 36.211 shall be used in order to decide the RSRP, and if the user equipment (UE) is capable of reliably detecting an available cell-specific reference signal $R_1$, $R_1$ may also be used in addition to $R_0$ in order to decide the RSRP. A reference point for the RSRP shall correspond to an antenna connector of the user equipment, and, in case reception diversity is used by the user equipment, the value that is being reported should not be lower (or smaller) than the RSRP corresponding to an arbitrary individual diversity branch.

RSRQ (Reference Signal Received Quality) may be defined as a ratio of $$\frac{N \times RSRP}{E\text{-}UTRA \text{ carrier } RSSI}.$$

Herein, N represents a number of resource blocks (RBs) of a RSSI measurement bandwidth of an E-UTRA carrier. Herein, a numerator (i.e., RSRP) and a denominator (i.e., RSSI of the E-UTRA carrier) should be measured within the same resource blocks.

An E-UTRA Carrier Received Signal Strength Indicator (RSSI) includes a linear average of a total received power, which is measured by the user equipment (UE) from N number or more resource blocks including the reference signals for antenna port 0 within the measurement bandwidth. The user equipment may measure the RSSI of the E-UTRA from all sources including Co-channel Serving Cells and non-Serving Cells, adjacent channel interference, thermal noise, and so on. If indication is made with respect to specific subframe(s) for performing RSRQ measurement via higher layer signaling, the RSSI is measured with respect to all OFDM symbols within the indicated subframe.

A reference point for the RSRQ shall correspond to an antenna connector of the user equipment, and, in case reception diversity is used by the user equipment, the value that is being reported should not be lower (or smaller) than the RSRQ corresponding to an arbitrary individual diversity branch.

Additionally, in order to allow user equipments, which perform communication with the serving cell, to effectively perform the RRM operations with respect to the neighboring cells, the serving cell may notify information on a MBSFN configuration relation between the serving cell and the neighboring cells and/or information on a TDD uplink-downlink configuration (UL-DL configuration) relation between the serving cell and the neighboring cells. For example, such information is shown as examples within the 3GPP Ts 36.331 release 11, and the content is defined as shown below in Table 3 and Table 4.

TABLE 3

- NeighCellConfig
The IE NeighCellConfig is used to provide the information related to MBSFN and TDD UL/DL configuration of neighbour cells.
  NeighCellConfig information element
-- ASN1START
NeighCellConfig ::=        BIT STRING (SIZE (2))
-- ASN1STOP

TABLE 4

NeighCellConfig field descriptions neighCellConfig
Provides information related to MBSFN and TDD UL/DL configuration of neighbour cells of this frequency
00: Not all neighbour cells have the same MBSFN subframe allocation as the serving cell on this frequency, if configured, and as the PCell otherwise
10: The MBSFN subframe allocations of all neighbour cells are identical to or subsets of that in the serving cell on this frequency, if configured, and of that in the PCell otherwise
01: No MBSFN subframes are present in all neighbour cells
11: Different UL/DL allocation in neighbouring cells for TDD compared to the serving cell on this frequency, if configured, and compared to the PCell otherwise
For TDD, 00, 10 and 01 are only used for same UL/DL allocation in neighbouring cells compared to the serving cell on this frequency, if configured, and compared to the PCell otherwise.

Accordingly, the user equipment may efficiently perform RRM operations taking into consideration each of the subframe properties and/or CRS transmission properties of the neighboring cells based upon the information according to Table 3 (i.e., NeighCellConfig).

Table 4 shows an example of the information according to Table 3. In Table 4, the information respective to Table 3 (i.e., NeighCellConfig) is defined as a total of 4 different states. Herein, cases when the 'NeighCellConfig' is respectively set to '00' or '10' or '01', may be restrictedly applied only to a case when the serving cell and the neighboring cells follow the same TDD uplink-downlink configuration. Conversely, a case when the 'NeighCellConfig' is respectively set to '00' may be used for a purpose of notifying that the serving cell and the neighboring cells follow different TDD uplink-downlink configurations.

However, if each of the cells dynamically changes its radio resource purpose in accordance with its respective system load status, the type of TDD uplink-downlink configurations of the individual cells with reference to which the determination on whether the TDD uplink-downlink configurations of neighboring cells in Table 3 and Table 4 are the same as the TDD uplink-downlink configuration of the serving cell may be required to be additionally defined. For example, in case a specific cell dynamically changes the radio resource purpose, in light of the corresponding cell, this is because a conventional TDD uplink-downlink configuration based upon SIB and a changed (or modified) TDD uplink-downlink configuration based upon a signal (e.g., MAC Signaling or RRS Signaling or Physical Control Channel), which is predefined, may exist.

<First Embodiment>

Accordingly, in the present invention, in case each of the cells dynamically changes its radio resource purpose in accordance with its load status, the determination on whether the TDD uplink-downlink configurations of neighboring cells are the same as the TDD uplink-downlink configuration of the serving cell may be configured so that the decision (or determination) can be made with reference to a SIB-based TDD uplink-downlink configuration of the serving cell. Furthermore, the types of the TDD uplink-downlink configurations of the neighboring cells, which are subject to the comparison (i.e., a comparison on whether or not the TDD uplink-downlink configuration of the neighboring cells and the serving cell are the same or different from one another) may be restricted (or limited) to one of i) a "SIB-based TDD uplink-downlink configuration type", ii) or a "TDD uplink-downlink configuration type, which is configured through a separate preset (or pre-defined) signaling (e.g., MAC Signaling or RRS Signaling or Physical Control Channel)", iii) or a "SIB-based TDD uplink-downlink configuration type and TDD uplink-downlink configuration type, which is configured through a separate pre-defined signaling".

According to an exemplary embodiment of the present invention, if the determination on whether the TDD uplink-downlink configurations of neighboring cells and the TDD uplink-downlink configuration of the serving cell are the same or different from one another, settings may be made so that the decision can be made with reference to a comparison between the SIB-based TDD uplink-downlink configurations of the serving cell and the neighboring cells. In this case, even if the TDD uplink-downlink configurations that are currently being used by each cell are different from one another, if the SIB-based TDD uplink-downlink configurations between each cell are the same, it will be finally determined that the TDD uplink-downlink configurations of the neighboring cells and the serving cell are the same.

Herein, the serving cell may configure settings so as to additionally notify its user equipments via pre-defined signaling or to allow its user equipments to implicitly understand based upon a pre-defined rule the information on subframes that are used for a fixed downlink purpose, which can have stable (or valid) RRM operations respective to the neighboring cells to be performed thereto, or downlink subframes that cannot have their purpose changed. For example, the serving cell may configure settings so as to allow its user equipments to additionally notify via pre-defined signaling or to implicitly determine based upon a pre-defined rule the information on subframes having (E)PSS/(E)SSS/(E)PBCH/(E)SIB/(E)PAGING information transmitted thereto (i.e., in case of the FDD system, subframes #0, #4, #5, and #9, and, in case of the TDD system, subframes #0, #1, #5, and #6) or subframes being commonly used for a downlink purpose by the cells, as the subframes that are used for a fixed downlink purpose, which can have stable (or valid) RRM operations respective to the neighboring cells to be performed thereto.

This exemplary embodiment may prevent in advance the user equipment of the serving cell from performing RRM operations within one of the subframes of the neighboring cells among i) downlink subframes having their purpose changed, ii) or uplink subframes, iii) or subframes that are not valid for performing RRM operations, iv) or subframes to which a specific reference signal (e.g., CRS) that is used for performing the RRM operations is not transmitted. Additionally, the exemplary embodiment of the present invention may also be restrictedly applied only to a case when the serving cell has defined settings so that the user equipment can perform Restricted Measurement operations.

According to another exemplary embodiment of the present invention, if the determination on whether the TDD uplink-downlink configurations of neighboring cells and the TDD uplink-downlink configuration of the serving cell are the same or different from one another, settings may be made so that the decision can be made through a comparison between 'the SIB-based TDD uplink-downlink configuration of the serving cell' and the pre-defined 'TDD uplink-downlink configurations that are configured via separate signaling and/or SIB-based TDD uplink-downlink configurations of the neighboring cells' of the neighboring cells.

Herein, the serving cell may configure settings so as to allow its user equipments to additionally notify via pre-defined signaling or to implicitly determine based upon a pre-defined rule the information on subframes that are used for a fixed downlink purpose, which can have stable (or valid) RRM operations respective to the neighboring cells to be performed thereto, or downlink subframes that cannot have their purpose changed. For example, the serving cell may configure settings so as to additionally notify its user equipments via pre-defined signaling or to allow its user equipments to implicitly understand based upon a pre-defined rule the information on subframes having (E)PSS/(E)SSS/(E)PBCH/(E)SIB/(E)PAGING information transmitted thereto (i.e., in case of the FDD system, subframes #0, #4, #5, and #9, and, in case of the TDD system, subframes #0, #1, #5, and #6) or subframes being commonly used for a downlink purpose by the cells, as the subframes that are used for a fixed downlink purpose, which can have stable (or valid) RRM operations respective to the neighboring cells to be performed thereto.

This exemplary embodiment may prevent in advance the user equipment of the serving cell from performing RRM operations within one of the subframes of the neighboring cells among i) downlink subframes having their purpose changed, ii) or uplink subframes, iii) or subframes that are not valid for performing RRM operations, iv) or subframes to which a specific reference signal (e.g., CRS) that is used for performing the RRM operations is not transmitted. Additionally, the exemplary embodiment of the present invention may also be restrictedly applied only to a case when the serving cell has defined settings so that the user equipment can perform Restricted Measurement operations.

According to yet another exemplary embodiment of the present invention, the serving cell may configure settings so as to additionally notify its user equipments only of the information on the neighboring cells having their radio resource purpose dynamically changed via pre-defined signaling. Accordingly, the serving cell may configure settings so that the user equipment can implicitly perform RRM operations respective to the neighboring cells in i) downlink subframes, ii) or subframes having fixed downlink purposes, or iii) downlink subframes that cannot have their purposes changed (or modified) (i.e., in case of the FDD system, subframes #0, #4, #5, and #9, and, in case of the TDD system, subframes #0, #1, #5, and #6) corresponding to a specific location (or time point) based upon a pre-defined rule. For example, the information on whether or not the neighboring cells have their radio resource purposes dynamically changed may be indicated (to the user equipment) by being defined as an additional status (e.g., bit) within the information on the MBSFN configuration relation between the serving cell and the neighboring cells and/or the TDD uplink-downlink configuration configuration relation between the serving cell and the neighboring cells, which are given as examples in Table 3 and Table 4. Furthermore, such exemplary embodiment may also be restrictedly applied only to a case when the serving cell has defined settings so that the user equipment can perform Restricted Measurement operations.

According to yet another exemplary embodiment of the present invention, in case each of the cells dynamically changes its radio resource purpose in accordance with its load status, the determination on whether the TDD uplink-downlink configurations of neighboring cells are the same as the TDD uplink-downlink configuration of the serving cell may be configured so that the decision (or determination) can be made with reference to a 'SIB-based TDD uplink-downlink configuration of the serving cell' and/or a 'TDD uplink-downlink configuration type, which is configured through a separate pre-defined signaling (e.g., MAC Signaling/RRS Signaling/Physical Control Channel)'. Furthermore, the types of the TDD uplink-downlink configurations of the neighboring cells, which are subject to the comparison (i.e., a comparison on whether or not the TDD uplink-downlink configuration of the neighboring cells and the serving cell are the same or different from one another) may be restricted (or limited) to one of i) a "SIB-based TDD uplink-downlink configuration type", ii) or a "TDD uplink-downlink configuration type, which is configured through a separate pre-defined signaling (e.g., MAC Signaling or RRS Signaling or Physical Control Channel)", iii) or a "SIB-based TDD uplink-downlink configuration type and TDD uplink-downlink configuration type, which is configured through a separate pre-defined signaling".

According to yet another exemplary embodiment of the present invention, in case settings are made so that a pre-defined specific reference signal (e.g., CRS/CSI-RS/DM-RS), which is used for performing the RRM operations of the user equipment, can be transmitted from uplink subframes having their purposes modified (or changed) (or downlink subframes having their purposes modified (or changed)), the determination on whether the TDD uplink-downlink configurations of neighboring cells and the TDD uplink-downlink configuration of the serving cell are the same or different from one another may be configured to be implicitly decided based upon a comparison between 'the SIB-based TDD uplink-downlink configuration of the serving cell and/or the pre-defined TDD uplink-downlink configurations of the service cell that are configured via separate signaling' and 'the SIB-based TDD uplink-downlink configurations of the neighboring cells and/or the pre-defined TDD uplink-downlink configurations of the neighboring cells that are configured via separate signaling' of the neighboring cells.

Additionally, the exemplary embodiments of the present invention may also be extendedly applied to a case when CSI-RS based RRM is being performed. For example, in case of CoMP Scenario #4, as each of the Transmission Points (TPs) (all or partially) transmits different resource configuration based CSI-RSs, the resource purpose changing operation may be individually performed. In this case, the user equipments may perform CSI-RS based RRM in order to measure channel quality (or link reliability) respective to each transmission point, and, under such circumstances, the above-described exemplary embodiments of the present invention may be extendedly applied.

Hereinafter, the above-described exemplary embodiments of the present invention will be described with respect to a case of being extendedly applied to a wireless communication system wherein NCT is being used.

In case of the LTE system, a Reference Signal (e.g., CCRC, CSI-RS, DM-RS), a physical control channel (e.g., (E)PDCCH, (E)PCFICH, (E)PHICH), a system information transmission channel (e.g., (E)PBCH, (E)SIB), and a synchronization channel (e.g., (E)PSS, (E)SSS), and so on, are transmitted from a subframe, which is configured for the purpose of downlink within a specific cell (or component carrier) (hereinafter referred to as LCT (Legacy Carrier Type)), and, based upon this, the legacy user equipments (Legacy UEs) may be ensured with physical uplink/downlink data communication with a specific cell, system information reception, and time/frequency synchronization, and so on (i.e., Backward Compatibility).

However, in future wireless communication systems, a newly defined form of cell (or component carrier) may be adopted, wherein all or part of the physical channel (or reference signal), which was transmitted to the above-described Legacy UEs within a cell (or component carrier) having Backward Compatibility, is not transmitted due to reasons of enhancing the problem of inter-cell interference, enhancing extendibility of a cell (or component carrier), increasing a degree of freedom in applying evolved technology, and so on.

In the present invention, such form of cell (or component carrier) will be referred to as a NCT (New Carrier Type) for simplicity in the description.

For example, in the NCT, instead of a CRS (having a high density) that is transmitted within a legacy downlink system bandwidth, the NCT may be defined to transmit a low density CRS having a pre-defined (or pre-configured) frequency domain position or cycle period (or interval) (e.g., 5 ms). Herein, for example, the CRS of of the low density may be used for the purpose of performing synchronization tracking within a time-frequency resource area of the user equipment, and, hereinafter, for simplicity in the description, the CRS used for the purpose of synchronization tracking will be referred to as a TRS (Tracking Reference Signal).

Additionally, a TRS that is being transmitted within the NCT may be transmitted based upon a pre-defined specific antenna port (e.g., CRS Antenna Port 0), or may be transmitted based upon a number of specific antenna ports, and the corresponding TRS may also be configured not to be used for the purpose of control/demodulation of data.

Moreover, in the NCT, among the conventional (or legacy) transmission modes (TMs), it may be defined that only the transmission modes (e.g., TM 9/10) that can perform decoding operations based upon reference signals (e.g., DM-RS) other than the CRS will be used. Furthermore, in the NCT, it may be defined that a synchronization signal (e.g., PSS/SSS) for time/frequency synchronization having the same format as that of the legacy synchronization signal is transmitted within the same resource area as the legacy resource area (or within a resource area that is modified from the legacy resource area), or it may be defined that a synchronization signal (e.g., (E)PSS/(E)SSS) for time/frequency synchronization having a format that is modified from the legacy synchronization signal is transmitted within a resource area that is modified from the legacy resource area (or within the same resource area as the legacy resource area). Additionally, in the NCT, configurations may be made so that a pre-defined specific reference signal having the same format as the legacy reference signal and having the purpose of RRM/RLM can be transmitted, or configurations may also be made so that a pre-defined specific reference signal having a format that is modified from that of the legacy reference signal and having the purpose of RRM/RLM can be transmitted.

Accordingly, information (e.g., information on a MBSFN configuration relation between the serving cell and the neighboring cells and/or information on a TDD uplink-downlink configuration relation between the serving cell and the neighboring cells), which is notified by the serving cell being given as an example in Table 3 and Table 4 to the user equipments in order to allow the RRM operations to be effectively performed with respect to the neighboring cells, may not be valid for the cells of the NCT.

For example, within the cells of the NCT, in a subframe transmitting a TRS having an interval (or cycle period) of 5 ms, the transmission of the TRS may be ensured regardless of the purpose for which the corresponding subframe is being modified. Additionally, if the corresponding TRS is being used for the RRM operations of the user equipment, information on whether the TDD uplink-downlink configurations of the neighboring cells are the same as or different from the TDD uplink-downlink configuration of the serving cell (i.e., NeighCellConfig) may become information that is not valid for performing RRM operations respective to the neighboring cells of the user equipment. More specifically, this is because, regardless of the presence or absence of information on whether the TDD uplink-downlink configurations of the serving cell and the neighboring cells are identical to one another or different from one another, in case the neighboring cell is a NCT, the user equipment may perform RRM only in the subframes transmitting a TRS having an interval (or cycle period) of 5 ms.

In other words, even if the TDD uplink-downlink configurations of the serving cell and the neighboring cells are identical to one another, in case the neighboring cell is a NCT, with the exception for the subframes transmitting a TRS having a predetermined interval (or cycle period) (e.g., 5 ms), since the TRS that is used for the RRM operations of the user equipment is not transmitted in the remaining downlink subframes, the corresponding remaining downlink subframes cannot be additionally used for the RRM operations.

Accordingly, additional definition is required to be made on the types of carriers based upon which the information on whether or not the TDD uplink-downlink configurations between the cells are identical to one another, wherein the information is notified by the serving cells in order to efficiently perform the RRM operations with respect to the neighboring cells of the user equipment.

Therefore, according to an exemplary embodiment of the present invention, the determination on whether the TDD uplink-downlink configurations of neighboring cells and the TDD uplink-downlink configuration of the serving cell are the same or different from one another (or the information for the same) may be configured to be restricted only to a case when all of the serving cell and the neighboring cells correspond to LCT type cells.

Accordingly, in case the serving cell and the neighboring cells, to which the present invention is being applied, all correspond to LCT type cells, and in case the TDD uplink-downlink configurations of the LCT type serving cell and the LCT type neighboring cells are the same, a time point, which is configured as a downlink subframe respective to the serving cell, corresponds to a downlink subframe in the neighboring cell, and the transmission of a CRS, which is used for the RRM operations of the UE, in the corresponding downlink subframes of the serving cell and the neighboring cells may also be ensured. Additionally, in case the exemplary embodiment of the present invention is applied, information on whether the TDD uplink-downlink configurations of the neighboring cells and the TDD uplink-downlink configuration of the serving cell are identical to one another or different from one another may also be interpreted as (implicitly) notifying whether or not the carrier types of the neighboring cells correspond to the LCT.

According to yet another exemplary embodiment of the present invention, the determination on whether the TDD uplink-downlink configurations of neighboring cells and the TDD uplink-downlink configuration of the serving cell are the same or different from one another (or the information for the same) may be configured to be restricted to a case when only the neighboring cells are the LCT type cells. Herein, the determination on whether or not the TDD uplink-downlink configurations of the cells are identical to one another (or the information for the same) is irrelevant to the carrier type of the serving cell, and its validity may be decided only by the carrier types of the neighboring cells.

In case the neighboring cells to which the present invention is being applied correspond to LCT type cells, and in case the TDD uplink-downlink configurations of the NCT type serving cell and the LCT type neighboring cells are identical to one another, a time point, which is configured as a downlink subframe respective to the serving cell, corresponds to a downlink subframe in the neighboring cell, and the transmission of a CRS, which is used for the RRM operations of the UE, in the corresponding downlink subframes of the neighboring cells may also be ensured. Conversely, in case of the NCT type serving cell, if the TRS (i.e., CRS of antenna port #0) is used for the RRM operations of the user equipment, the transmission of the TRS that is being used for the RRM operations of the user equipment may be ensured only in the downlink subframes transmitting the TRS having a predetermined cycle period (or interval) (e.g., 5 ms).

More specifically, in light of a LCT type neighboring cell, even in case of a downlink subframe time point from which the CRS that is being used for the RRM operations of the user equipment is transmitted, in case of the NCT type serving cell, the TRS that is being used for the RRM operations of the user equipment may not be transmitted at the corresponding time point.

Additionally, in case the exemplary embodiment of the present invention is applied, information on whether the TDD uplink-downlink configurations of the neighboring cells and the TDD uplink-downlink configuration of the serving cell are identical to one another or different from one another may also be interpreted as (implicitly) notifying whether or not the carrier types of the neighboring cells correspond to the LCT.

According to yet another exemplary embodiment of the present invention, in case the neighboring cell is a NCT, in order to efficiently perform RRM operations with respect to the neighboring cells of the user equipment, information (or status) on the TDD uplink-downlink configuration relation between the serving cell and the neighboring cells for a case when the neighboring cells are NCT cells may be additionally defined in the information (i.e., NeighCellConfig)

according to Table 3 and Table 4. Such additional definition is effective in a case when a reference signal other than the TRS is defined (or used) within the NCT type cell for the RRM operations, or in a case when the TRS as well as another pre-defined reference signal are defined (or used) within the NCT type cell for the RRM operations. For example, although the corresponding other reference signal (e.g., CSI-RS or DM-RS) is transmitted based upon pre-defined cycle period (or interval)/antenna port configuration/resource area, configurations may be made so that transmission can be performed only in a case when the transmission point of the corresponding other reference signal is configured as a downlink subframe (i.e., whether or not the transmission is to be performed may be influenced by the TDD uplink-downlink (re-)configuration information).

Additionally, information on whether the TDD uplink-downlink configurations of the neighboring cells and the TDD uplink-downlink configuration of the serving cell are identical to one another or different from one another, which is additionally defined for a case when the neighboring cells are NCT type cells, may also be interpreted as (implicitly) notifying whether or not the carrier types of the neighboring cells correspond to the NCT.

As shown in Table 3 and Table 4, although the TDD uplink-downlink configurations of the neighboring cells are identical to the TDD uplink-downlink configuration of the serving cell, the configurations respective to MBSFN may not coincide for each cell. For example, such case may include i) a case when a group of subframes set to MBSFN of the neighboring cells is not the same as a group of subframes set to MBSFN of the serving cell (i.e., a case when 'NeighCellConfig' is set to 00), ii) or a case when a group of subframes set to MBSFN of the neighboring cells collectively corresponds to a subset of the group of subframes set to MBSFN of the serving cell (i.e., a case when 'NeighCellConfig' is set to 10), iii) or a case when none of the neighboring cells has a group of subframes set to MBSFN (i.e., a case when 'NeighCellConfig' is set to 01).

Herein, although the TDD uplink-downlink configurations of the neighboring cells match with (or are identical to) the TDD uplink-downlink configuration of the serving cell, the group of subframes set to MBSFN of the neighboring cells may not be the same as the group of subframes set to MBSFN of the serving cell. In this case, in accordance with a predefined rule, configurations may be made so that RRM operations can be performed with respect to the neighboring cells of the user equipment only in i) downlink subframes corresponding to fixed positions, ii) or downlink subframes that cannot have their purposes changed (or modified), iii) or downlink subframes that cannot be set to MBSFN (e.g., subframes having (E)PSS/(E)SSS/(E)PBCH/(E)SIB/(E)PAGING information transmitted thereto (i.e., in case of the FDD system, subframes #0, #4, #5, and #9, and, in case of the TDD system, subframes #0, #1, #5, and #6). Furthermore, the configurations on the above-described MBSFN may be extendedly applied to all of the exemplary embodiments of the present invention.

In the above-described exemplary embodiments of the present invention, the cell may notify the user equipment of a) information on whether or not the configurations according to the present invention is to be applied, b) or information on a location (or time point) of the subframes to which the configurations according to the present invention are to be applied, c) or information on the configurations according to the preset invention through a predefined signal (e.g., physical layer or higher layer signal). Alternatively, configurations may be made so that the cell can enable the user equipment to implicitly determine such information based upon a pre-defined rule.

Additionally, the above-described exemplary embodiments of the present invention may also be extendedly applied to a case when the user equipment performs Inter-Frequency RRM operations or Intra-Frequency RRM operations respective to its neighboring cells.

Since configurations/rules/examples according to the above-described present invention may also be included as one of the solutions for resolving the technical object of the present invention, it is an apparent fact that such configurations/rules/examples can be viewed as a type of exemplary embodiments. Additionally, although the above-described exemplary embodiments of the present invention can be independently implemented, the above-described exemplary embodiments of the present invention may also be implemented as a combination (or integration) of parts of the exemplary embodiments.

Figure 12:
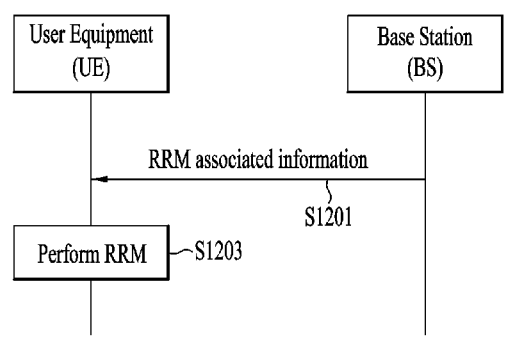
FIG. 12 illustrates an example of performing Radio Resource Management as a preferred exemplary embodiment of the present invention.

FIG. 12 illustrates a RRM measurement method according to a preferred exemplary embodiment of the present invention.

Referring to FIG. 12, the user equipment (UE) receives information for performing RRM operations from the base station (BS), thereby being capable of performing radio resource management (e.g., RRM/RLM) in accordance with the receiving information.

More specifically, in step S1201 of FIG. 12, the user equipment may receive information associated with radio resource management (RRM) according to the above-described exemplary embodiment of the present invention from the base station. In S1201, the user equipment may configure the information/configurations/rules for measuring the RRM in accordance with the details described above in the exemplary embodiments of the present invention, and, in some cases, such information/configurations/rules may be decided as a combination of at least parts of the above-described exemplary embodiments of the present invention.

The user equipment may perform RRM measurement based upon the information associated with RRM, which is received in step S1201 (S1203).

In the method for measuring RRM of the present invention, which is described above with reference to FIG. 12, the features described above in the diverse exemplary embodiments of the present invention may be independently applied or two or more exemplary embodiments may be simultaneously applied, and overlapping description will be omitted for clarity.

Figure 13:
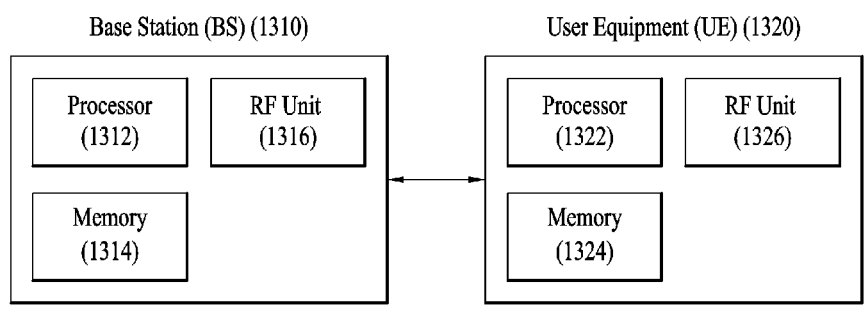
FIG. 13 illustrates an exemplary base station and an exemplary user equipment that can be applied to the exemplary embodiment of the present invention.

FIG. 13 illustrates an exemplary base station and an exemplary user equipment that can be applied to the exemplary embodiment of the present invention. In case a relay is included in a wireless communication system, in a backhaul link, communication is established between the base station and the relay, and, in an access link, communication is established between the relay and the user equipment. Therefore, the base station or the user equipment, which are presented as examples in the drawing, may be replaced with the relay in accordance with the corresponding circumstances.

Referring to FIG. 13, a wireless communication device includes a base station (BS, 1310) and a user equipment (UE, 1320). The base station (1310) includes a processor (1312), a memory (1314), and a Radio Frequency (RF) unit (1316). The processor (1312) may be configured to realize the procedures and/or methods, which are proposed in the present invention. The memory (1314) is connected to the processor (1312) and stores diverse information related to the operations of the processor (1312). The RF unit (1316) is connected to the processor (1312) and transmits and/or receives radio signals. The user equipment (1320) includes a processor (1322), a memory (1324), and a RF unit (1326). The processor (1322) may be configured to realize the procedures and/or methods, which are proposed in the present invention. The memory (1324) is connected to the processor (1322) and stores diverse information related to the operations of the processor (1322). The RF unit (1326) is connected to the processor (1322) and transmits and/or receives radio signals. The base station (1310) and/or the user equipment (1320) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. The memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although the above-described method for managing radio resource in a multi-cell wireless communication system and device therefor according to the present invention are described based upon an example being applied to the 3GPP LTE system, the present invention may also be applied to other diverse wireless communication systems in addition to the 3GPP LTE system.

What is claimed is:

1. A method of performing a Radio Resource Management (RRM) measurement by a user equipment in a multi-cell wireless communication system, the method comprising:
    receiving, from a Serving Cell, information associated with an RRM for a Neighboring Cell,
    wherein the information associated with the RRM corresponds to NeighCellConfig;
    configuring subframes for RRM measurement with specific subframes which are prohibited from dynamically changing, if the information associated with the RRM indicates that the uplink-downlink configurations (UL-DL configurations) of the neighboring cell are to be dynamically changed; and
    performing an RRM measurement on the specific subframes for the neighboring cell according to the information associated with the RRM, when the UE is configured to perform a restricted measurement by a serving cell,
    wherein the serving cell and the neighboring cell are respectively set to change at least one uplink subframe according to a preset uplink-downlink configuration (UL-DL configuration) for downlink communication, and
    wherein subframes for an RRM measurement for the neighboring cell are determined to be the same as subframes for an RRM measurement of the serving cell, if the information associated with the RRM indicates the uplink-downlink configurations (UL-DL configurations) of the serving cell and the neighboring cell are the same.

2. The method of claim 1, wherein the preset uplink-downlink configuration is configured in accordance with a SIB (System Information Block) or configured in accordance with a higher layer signaling.

3. The method of claim 1,
    wherein the NeighCellConfig information is configured as a bitmap, and
    wherein, in case the bitmap corresponds to one of '00', '01', and '10', the NeighCellConfig indicates that the uplink-downlink configurations (UL-DL configurations) of the serving cell and the neighboring cell are the same.

4. The method of claim 1, wherein, in case a subframe group set to MBSFN (Multicast Broadcast Single Frequency Network) with respect to the serving cell is different from a subframe group set to MBSFN (Multicast Broadcast Single Frequency Network) with respect to the neighboring cell, the subframes for an RRM measurement correspond to subframes configured only for a downlink.

5. A user equipment performing a Radio Resource Management (RRM) measurement in a multi-cell wireless communication system, the user equipment comprises:
a Radio Frequency Unit; and
a Processor,
wherein the Processor is configured to:
receive, from a Serving Cell, information associated with an RRM for a Neighboring Cell,
wherein the information associated with the RRM corresponds to NeighCellConfig,
configure subframes for RRM measurement with specific subframes which are prohibited from dynamically changing, if the information associated with the RRM indicates that the uplink-downlink configurations (UL-DL configurations) of the neighboring cell are to be dynamically changed, and
perform an RRM measurement on the specific subframes for the neighboring cell according to the information associated with the RRM, when the UE is configured to perform a restricted measurement by a serving cell,
wherein the serving cell and the neighboring cell are respectively set to change at least one uplink subframe according to a preset uplink-downlink configuration (UL-DL configuration) for downlink communication, and
wherein subframes for an RRM measurement for the neighboring cell are considered to be the same as subframes for an RRM measurement of the serving cell, if the information associated with the RRM indicates the uplink-downlink configurations (UL-DL configurations) of the serving cell and the neighboring cell are the same.

6. The user equipment of claim 5, wherein the preset uplink-downlink configuration is configured in accordance with a SIB (System Information Block) or configured in accordance with a higher layer signaling.

7. The user equipment of claim 6,
wherein the NeighCellConfig information is configured as a bitmap, and
wherein, in case the bitmap corresponds to one of '00', '01', and '10', the NeighCellConfig indicates that the uplink-downlink configurations (UL-DL configurations) of the serving cell and the neighboring cell are the same.

8. The user equipment of claim 5, wherein, in case a subframe group set to MBSFN (Multicast Broadcast Single Frequency Network) with respect to the serving cell is different from a subframe group set to MBSFN (Multicast Broadcast Single Frequency Network) with respect to the neighboring cell, the subframes for an RRM measurement correspond to subframes configured only for a downlink.

* * * * *